Oct. 25, 1938.    H. DUMONT    2,134,440
PROPELLING DEVICE FOR VEHICLES
Filed Jan. 22, 1934
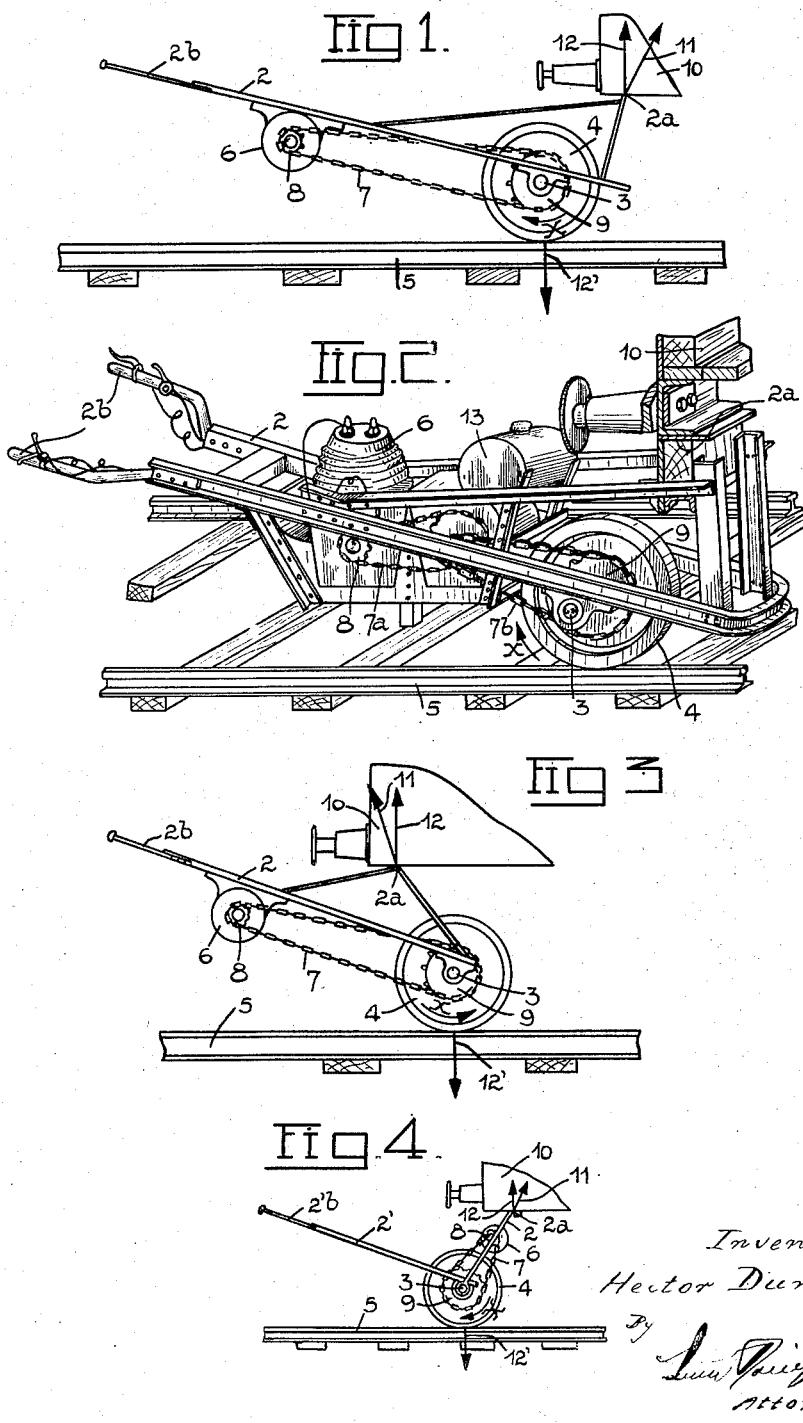
Inventor:
Hector Dumont Patented Oct. 25, 1938

2,134,440

UNITED STATES PATENT OFFICE 2,134,440

PROPELLING DEVICE FOR VEHICLES

Hector Dumont, Jambes, Belgium

Application January 22, 1934, Serial No. 707,806
In Belgium February 1, 1933

3 Claims. (Cl. 105—141)

The present invention relates to a car propelling device, in which the friction between a driving wheel and a rail necessary for moving the car to be moved is obtained partially by applying to the driving wheel or wheels a part of the weight of the car.

Devices of this type are known which comprise a pivoted arm mounted on a carriage carrying the engine, said arm being directed obliquely in order to be applied to the frame of the car outside the vertical plane passing through the axis about which the arm is pivoted. With these devices, the wheels of the carriage are submitted to a vertical reaction equal to the vertical component of the effort exerted by the arm on the car.

Devices are also known in which the engine is carried by a pivoted lever mounted on a carriage. In these devices, the pivoted lever comprises a mechanical connection including gear wheels which rotate the driving wheels and a friction roller applied on the rim of one of the wheels of the car to be moved.

In comparison with the preceding devices, these devices possess the advantage of giving rise to a supplementary vertical reaction on the driving wheels, this supplementary vertical reaction being due to the fact that the engine is carried by the pivoted lever.

In the normal conditions of use, the driving wheels of these devices skid on the rail, which produces a loss of power corresponding to the friction energy and diminishes the output of the device.

The present invention has for its object a propelling device constructed to produce a double vertical reaction on the driving wheels due, on the one hand, to the oblique arrangement of the lever and, on the other hand, to the mounting of the engine on the pivoted lever, and to suppress the disadvantage of the skidding of the wheels on the rail.

To this effect, according to the invention, the pivoted lever carrying the engine bears directly on the frame of the car or near the frame on a part integral with the latter.

The propelling device according to the invention is more efficient than that which is applied on the rim of one of the wheels of the car. In comparison with the devices in which the engine is carried by the carriage, the device of the invention imparts a supplementary vertical reaction on the driving wheels. Finally, in comparison with the latter devices it has the advantage, due to the engine, of producing a vertical reaction independent of the diameter of the driving wheels.

The annexed drawing shows diagrammatically by way of example only, some embodiments of the invention.

Figure 1 is a diagram of a constructional form of a propelling device according to the invention.

Figure 2 is a perspective view of the embodiments shown diagrammatically in Figure 1.

Figure 3 shows diagrammatically a modification of the invention.

Figure 4 shows diagrammatically another modification of the invention.

In these various figures the same reference numerals denote the same parts.

Referring to Figure 1, it will be seen that the propelling device is constituted by a lever 2 adapted to pivot about the axle 3 of a wheel 4 running on a rail 5. The pivoted lever 2 carries an engine 6 which, through the medium of a mechanical connection, such as for example a chain 7 passing over sprocket wheels 8 and 9, is adapted to cause the wheel 4 to rotate in the direction of the arrow X. The lever 2 is applied below the frame or the body of a car 10 at a point 2a which is situated outside the vertical plane passing through the axis of the axle 3 about which the lever 2 pivots. The lever 2 could obviously be applied in the neighbourhood of the frame or of the body on a part integral with these members.

It follows from this arrangement that the effect of the torque exerted by the engine is to produce on the car an action represented by the vector 11. The said vector, more particularly, has a vertical component 12 which produces an equal and opposite reaction 12' of the wheel 4 on the rail 5, and consequently provides friction for the said wheel on the rail 5.

The lever 2 is provided with two handles 2b for facilitating the guiding of the device and on which the driver may act, during the guiding, in order to increase the reaction on the driving wheel.

Figure 2 shows diagrammatically by way of example a device according to the invention, in which the lever 2 is constituted by a light metal frame. The engine 6 is constituted for example by a gasoline or heavy oil engine, the fuel for which is contained in a tank 13. The transmission of the torque from the engine to the wheel 4 is effected by means of two chains denoted by 7a and 7b, a clutch device (concealed in the engine housing) being provided between the toothed wheels by means of which the movement of the chain 7a is transmitted to the chain 7b.

Figure 3 shows diagrammatically another constructional form of the invention, by means whereof the car 10 is moved by traction instead of being pushed, as in the case of Figures 1 and 2. This is due to the fact that the point of application 2a is situated on the same side of the vertical plane passing through the pivotal axis of the lever as the arm of the lever 2 by which the device is guided. This constructional form possesses the advantage of permitting the driver to see if the track is clear.

The lever carrying the engine and bearing under the car need not necessarily carry the handles whereby the device is guided. The latter may be constituted for example as shown in Figure 4, in which it will be seen that the engine 6 is carried by the lever 2 adapted to pivot about the axle 3 independently of the lever 2' carrying the handles 2'b whereby the device is guided.

It is obvious that the propelling device according to the invention may be employed for moving other vehicles than those running on rails, and that it is not necessary for the device itself to run on rails. It is likewise obvious that many modifications may be made in the form and constitution of the elements employed in its construction without departing from the scope of the present invention. For example, the axle 3 may be mounted on two carrying wheels, or the pivoting lever may be mounted on a carriage carried by two axles having one or two wheels. These latter constructional forms may possess advantages more particularly in regard to the driving of the device and the distribution of the loads.

What I claim is:

1. An apparatus for shifting vehicles over a substantially horizontal surface, comprising at least one driving wheel adapted to roll on said surface, an axle for said wheel, a frame mounted on said axle for pivotal movement about the axis of said axle, said frame having a portion projecting in front of a vertical plane passing through said axle and upwardly above the periphery of said wheel to engage an under surface of the vehicle to be shifted at a point in front of said vertical plane, a motor mounted on the portion of said frame projecting in front of said vertical plane and positioned between the axle and the point of engagement of the frame with the vehicle to be shifted, and means for transmitting motion from said motor to said driving wheel to rotate the latter in a single forward direction.

2. An apparatus for shifting vehicles over a substantially horizontal surface, comprising at least one driving wheel adapted to roll on said surface, an axle for said wheel, a frame mounted on said axle for pivotal movement about the axis of said axle, a motor mounted on said frame, means for transmitting motion from said motor to said driving wheel to rotate the latter in a single direction, said motor being positioned in front of said wheel, said frame having a portion extending upwardly above the periphery of said wheel at a point intermediate the motor and wheel to engage an under surface of the vehicle to be shifted at a point in front of a vertical plane passing through the axis of said axle, and handle means for guiding said frame.

3. An apparatus for shifting vehicles over a substantially horizontal surface, comprising a single wheel adapted to roll on said surface, an axle for said wheel, a frame supported by said axle on each side of said wheel, a motor mounted on said frame, means for transmitting motion from said motor to rotate said wheel in a single direction to drive the apparatus in a single direction, said frame having a portion projecting in front of a vertical plane passing through said axle and upwardly above the upper periphery of said wheel to engage an under surface of the vehicle to be shifted, and handle means mounted on said frame for guiding said frame.

HECTOR DUMONT.